Patented Sept. 7, 1937

2,092,567

UNITED STATES PATENT OFFICE 2,092,567

ROOFING MATERIAL

Stephen G. Wright, Chicago, Ill.

No Drawing. Application December 23, 1936,
Serial No. 117,419

5 Claims. (Cl. 91—68)

This invention relates to an improved roofing material and particularly to a natural colored rock granule which has been varnished with a protective surface coating for the purpose of rendering the surface thereof less susceptible to moisture and fumes.

It has been common practice among granule manufacturers for many years to treat roofing granules after they have been finished and properly graded with a surface coating of some form of varnish which may simply be an oil, a shellac or a varnish proper, either resinous or of cellulose esters.

Such coating materials, particularly those commonly employed, usually have a slightly yellowish tinge although the material itself is transparent. Thus the varnish dulls the natural color of the rock granules.

In accordance with this invention the rock granules are treated with such a transparent varnish that the dulling effect thereof is lessened or neutralized by the addition to the varnish of a minute amount of a pigment. The amount of pigment added is such that the substantial transparency of the coating is maintained but the varnish is tinted sufficiently that the off-color quality thereof is removed.

In carrying out the invention, the true color of the granule is determined. If this true color is one of the many shades of red, as for example, red slate or red brick, selection of the tinting agent should be made from red pigments such as iron oxide or red lead toned to the proper tint with some inert material such as clay or barytes. On the other hand, if the granule is naturally colored one of the shades of green, as for example, green slate or green trap rock, or one of the many highly intensified artificial greens, then the tinting of the coating material may be brought about by the use of chrome oxide or by a mixture of Prussian blue and chrome yellow (commonly known as chrome green) toned to the proper tint by the use of various inert fillers.

If the granule is white, as for example, white pottery or white quartz, then the coater is tinted white. In connection with white materials the yellowing effect of the varnish is particularly apparent. For example, a coating material comprising 21.5% of varnish gum, 28.6% non-volatile oils, 47.2% of volatile oils and 2.7% dryer, used at the rate of ten pounds of this material for one ton of roofing granules (generally ten to thirty mesh) produces a decidedly yellowing effect. In spreading this material on roofing granules further diluting material, for example six pounds of naphtha for ten pounds of the coater, is added for a non-absorbent rock granule such as quartz.

If, however, five pounds of white lead per ton of granules is added to the coating material, the film produced will still be transparent but the granules will now take on more nearly the color of the original rock particles.

In the making of the coating material it is understood that the color pigments are never used in an amount which approaches the production of a color varnish or shellac, but only to the extent required to substantially lessen the dulling effect of the coating medium.

The foregoing detailed description has been given for clearness of understanding only, and no unnecessary limitations should be understood therefrom, but the appended claims should be construed as broadly as permissible, in view of the prior art.

I claim:

1. Roofing material comprising a natural colored rock granule having thereon a transparent coating of a color different than the rock granule, said coating having incorporated therein a small amount of a pigment having the same color as the rock granule, the amount of pigment being sufficient to substantially lessen the staining effect thereof and being small enough not to destroy the transparency of the coating and to produce a coated granule having substantially the color of the uncoated granule.

2. Roofing material comprising a natural colored rock granule having thereon a transparent coating of a color different than the rock granule, said coating having incorporated therein a small amount of a pigment having the same color, but brighter than the rock granule, the amount of pigment not being enough to destroy the transparency of the coating but being sufficient to substantially lessen the staining effect thereof and the resulting coated granule having substantially the same color as the uncoated granule.

3. Roofing material comprising a base having thereon a coating of natural colored rock granules having thereon a transparent coating of a color different than the rock granules, said coating having incorporated therein a small amount of a pigment having the same color as the rock granules, the amount of pigment not being enough to destroy the transparency of the coating but being sufficient to substantially lessen the staining effect thereof.

4. Roofing material as set forth in claim 1, in which the coating is a water-insoluble varnish.

5. Roofing material as set forth in claim 1, in which the coating is oil-insoluble shellac.

STEPHEN G. WRIGHT.